United States Patent [19]
Slavitschek et al.

[11] Patent Number: 5,128,038
[45] Date of Patent: * Jul. 7, 1992

[54] FILTERING LAYOUT

[75] Inventors: Gert Slavitschek, Baden; Wilhelm Vollmann, Oberrohrdorf, both of Switzerland

[73] Assignee: Asea Brown Boveri Ltd., Baden, Switzerland

[*] Notice: The portion of the term of this patent subsequent to Jul. 7, 2008 has been disclaimed.

[21] Appl. No.: 398,827

[22] Filed: Aug. 7, 1989

[30] Foreign Application Priority Data

Aug. 9, 1988 [CH] Switzerland ............... 2994/88

[51] Int. Cl.$^5$ .............................................. B01D 29/50
[52] U.S. Cl. .............................. 210/323.2; 210/456
[58] Field of Search .............. 210/456, 323.2, 340, 210/420, 279

[56] References Cited

U.S. PATENT DOCUMENTS

| | | |
|---|---|---|
| 3,398,831 | 8/1968 | Jones . |
| 3,405,807 | 10/1968 | Burkhardt ............ 210/323.2 |
| 3,498,460 | 3/1970 | Lane . |
| 4,163,724 | 8/1979 | Muller et al. ............ 210/323.2 |
| 4,609,462 | 9/1986 | Flynn . |
| 4,872,981 | 10/1989 | Hobson, Jr. ............ 210/323.2 |
| 4,919,801 | 4/1990 | Hobson, Jr. ............ 210/323.2 |

FOREIGN PATENT DOCUMENTS 0209348 7/1986 European Pat. Off. .
993184 5/1965 United Kingdom .

*Primary Examiner*—Peter Hruskoci
*Assistant Examiner*—Robert J. Popovics
*Attorney, Agent, or Firm*—Burns, Doane, Swecker & Mathis

[57] ABSTRACT

A filtering apparatus for the purification of the condensate of a nuclear power station consists of a closed tank with an inflow pipe and an outflow pipe together with a tube sheet located in the tank. The tube sheet which divides the inside of the tank into a filtrate chamber and a turbid chamber and supports a plurality of precoat cartridge filters staggered by rows. The inflow pipe is seated in the tube sheet and is directed with its opening against a baffle. The baffle is equipped on its side facing the tube sheet with a perforated collar. The baffle includes a center recess and carries on its side facing away from the inflow pipe an overflow tube which extends essentially over the entire effective height of the cartridge filters and is directed with its upper opening against an impingement baffle. The impingement baffle is equipped on its side facing the cartridge filters with a second perforated collar.

11 Claims, 2 Drawing Sheets

FILTERING LAYOUT

BACKGROUND OF THE INVENTION

The invention generally relates to a filtering layout for the purification of the condensate of a power station heated by nuclear means. The present invention comprises a closed vessel with an inlet pipe and an outlet pipe together with a tube sheet located in the tank. The tube sheet divides the inside of the vessel into a filtrate chamber and a turbid chamber and supports a plurality of precoat cartridge filters staggered by rows. The filters project an active surface into the turbid chamber the hollow inside of which communicates with the filtrate chamber. The inlet pipe is seated substantially in the center of the tube sheet and is directed with its opening against a baffle plate located in the turbid chamber.

Nuclear power stations in general, and those with boiling water reactors in particular, require a condensate purification installation with filter layouts of this type in order to attain the necessary reactor water quality. Such installations are commonly known as powder resin precoat filters and, in addition to having significant ion exchange capacity, also have good mechanical filter properties.

A filter layout of this type is known from U.S. Pat. No. 4,609,462. Frequently, such powder resin precoat filters are not satisfactory relative to their service life. A particular disadvantage consists in the case of short service lives of the filters due to the fact that larger quantities of radioactively contaminated resins are obtained, which must be stored as radioactive wastes for long periods of time.

It was found in investigations carried out on completed installations that the causes of the rapidly decreasing service life after a certain operating period are probably the following:

erosion of the resins from the cartridge filters by locally excessive flow velocities;

clogging of the cartridge fabric at the eroded locations by iron oxides so that filtration is no longer possible in these locations;

irreversible clogging of the flow paths in sound areas by the eroded resins and thus further reduction of the active filter surface.

It is further known from comparative experiments that, in the case of reduced filter flow rates and the resulting lower flow velocities, service lives may increase disproportionally, or, at least service life problems occur to a much lesser extent.

OBJECTS AND SUMMARY OF THE INVENTION

An object of the present invention is to address the above-mentioned problems by providing a filter apparatus whereby locally high flow velocities may be reduced while maintaining full flow rates throughout the apparatus.

This object is attained according to the present invention by providing a filtering apparatus wherein:

the baffle plate is equipped with a first polygonal or cylindrical perforated collar on the side of the bottle plate facing the tube sheet, the wall of which is parallel to the longitudinal axis of the cartridge filters, the baffle plate has a center orifice and is equipped at the side facing the inlet pipe with an overflow tube that extends essentially over the entire effective height of the cartridge filters and is directed with its top opening against a baffle, which extends in the turbid chamber above the cartridge filters approximately perpendicularly to the longitudinal axis of the tank;

the baffle is equipped on its side facing the cartridge filters with at least one second polygonal or cylindrical perforated collar.

One advantage of the invention may be seen in that it is possible by simple means to carry out a division of the flow into at least two partial flows, each with a reduced flow velocity, wherein the partial flows are exposed additionally to throttling and equalization by means of the perforated collars. Existing installations may be retrofitted by these simple means without difficulty.

It is particularly appropriate to perforate the overflow tube and place a coaxial cylindrical displacement body inside of it wherein the displacement body terminates bluntly at its upper end with the opening of the overflow tube and is configured at its lower end in conformity with the flow and projects into the recess of the baffle plate. In this manner the cartridge filters, which represent pressure sinks, are able to receive working media from the flow through the overflow tube prior to the deflection of the upper part. The cylindrical configuration of the displacement body has an advantage over other forms in that the longitudinal velocity at the cartridge filters of the innermost row is low due to the outlet jet and, further, that said velocity remains at least substantially uniform over the entire height of the cartridges.

BRIEF DESCRIPTION OF THE DRAWING

Preferred embodiments of the invention are illustrated in the accompanying drawings, in which.

In the drawings, only parts essential for the comprehension of the invention are presented. In the different figures, like parts are designated by like reference symbols and the direction of flow is indicated by arrows.

DETAILED DESCRIPTION

Figure 1:
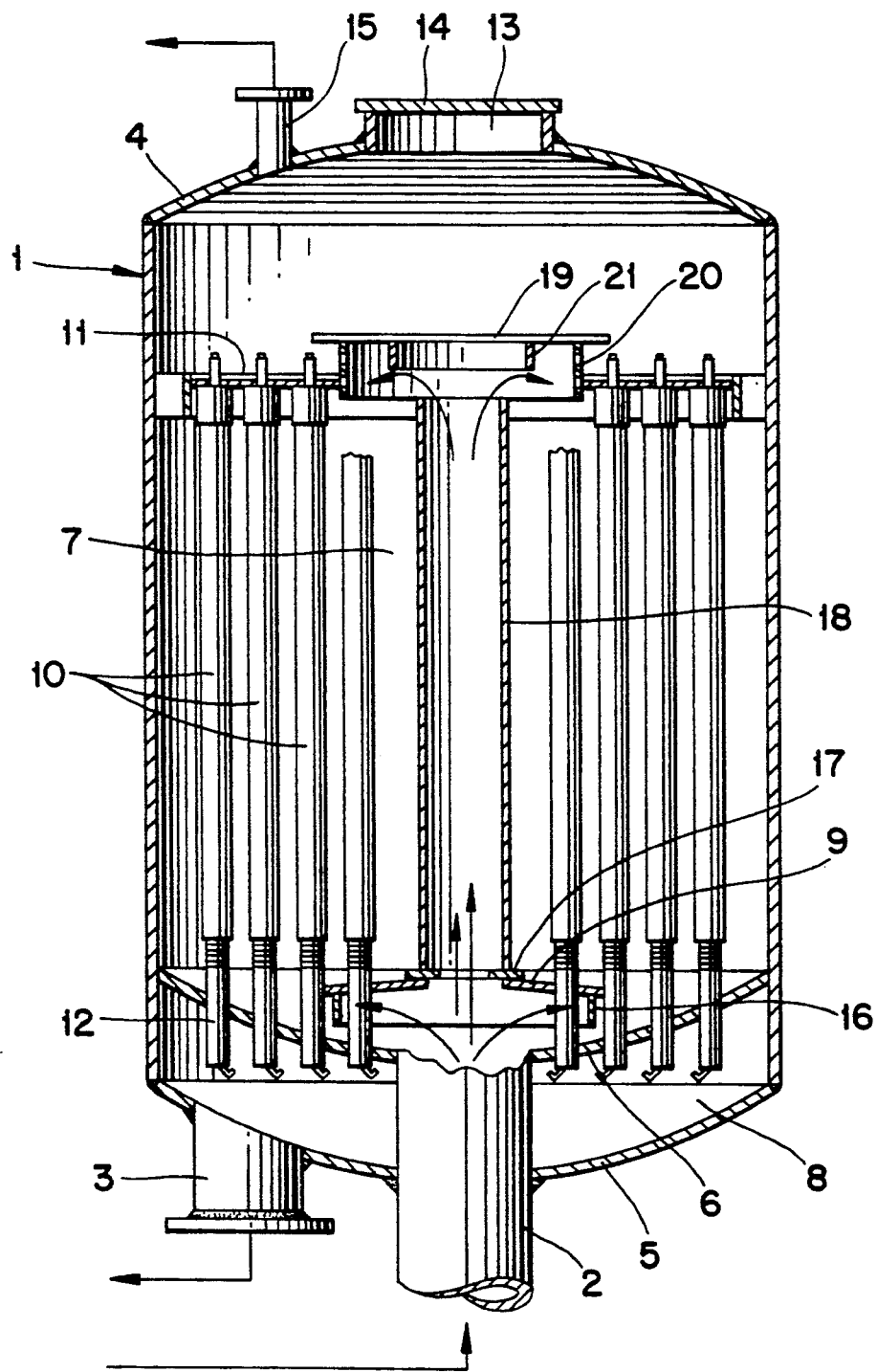
FIG. 1 shows a partial longitudinal section through a filtering layout.

A preferred embodiment of the filtering layout of the present invention comprises a vertical tank 1, enclosed on all sides and equipped with an inflow pipe 2 and an outflow pipe 3. The tank 1 is cylindrical in its longitudinal extent and is preferably made of steel. It is closed off on top with an outwardly convex cover 4 and on the bottom by an outwardly convex bottom 5. The inside of tank 1 is divided by a tube sheet 6 curving in a downwardly convex manner into a turbid chamber 7 and a filtrate chamber 8. The tube sheet is welded to the inner wall of the tank. The inflow pipe 2 is introduced centrally through the bottom 5 into the tank 1 and is extended through the filtrate chamber 8 to the tube sheet 6. At its opening, the inflow pipe 1 is welded to the tube sheet. The inflow pipe is oriented such that its opening is directed against a baffle 9 fastened to the turbid chamber 7 in an appropriate manner.

In the turbid chamber 7 a plurality of cartridge filters 10 is installed through which the working medium must flow prior to flowing into the filtrate chamber 8 and being drawn off the tank through the outlet line 3. The cartridge filters 10 are staggered in rows with each of the rows having a circular or arbitrarily polygonal horizontal projection. The cartridges are held in position at their upper end by a holder 11 (not shown in detail). Said holder is designed so that the cartridge filters, which are fastened to filter seat 12 in the tube sheet 6, may be removed.

The filter seats 12, which support the cartridge filters 10, comprise a small tube made of steel or the like welded to the tube sheet 6 which extends through passages in the tube sheet 6. The seats 12 are aligned parallel to the longitudinal axis of the tank 1 and connect through the hollow area inside the turbid chamber 7 with the filtrate chamber 8.

The vertical cartridge filters 10 are comprised of a rigid core tube made of a corrosion resistant material, provided with orifices, and a sieve material enclosing said core tube and coated with a precoat material of a grainy auxiliary filtering agent. The auxiliary filtering agent usually consists of ion exchange resin particles, which, in addition to the mechanical filter effect, also retain dissolved ionic impurities.

During operation, the auxiliary filter material applied as a coating of the cartridges, must periodically be replaced. The filter phase is then discontinued and, in order to empty the tank, the working medium is drawn off from the turbid chamber through the inflow pipe.

For handling purposes, a manhole 13 equipped with a closure 14, is provided in the cover 4. The cover 4 further comprises a ventilating or deaerating line 15 for the filling process.

For facilitating the flow to the cartridge filters 10, a perforated collar 16 is attached to the side of the convex baffle 9 that faces the tube sheet 6. The perforated collar may consist of a perforated metal sheet having an orifice ratio of about 40%. The wall of the perforated sheet extends parallel to the longitudinal axis of the cartridge filters and forms a cylindrical or polygonal collar depending on the staggered layout of the filters. In a preferred embodiment, the collar is suspended between the innermost row of cartridges and the row of cartridges adjacent the innermost row in the radially outward direction. It has a height, which for a regular operation, amounts to at least one-half of the width of the clearance between the baffle 9 and the tube sheet 6. This design significantly facilitates the flow to the cartridge filters as the flow remains uniquely radial and does not tend —as would ordinarily be the case in a collar having a damming effect—to form an annular vortex. The height of the channel through which the flow is passing reduces velocity peaks and there is no occurrence of backflow as may be the case if a perforated collar in the area of the tube sheet were not present.

Further facilitation of the flow to the cartridges occurs if, in addition to using a perforated collar 16, structure is added to divide the total flow into partial flows. To accomplish partial flows, a recess is incorporated into the center of baffle 9 along with a diaphragm 17. As a result, only a part of the inflowing working medium is deflected radially. Experiments have shown that a division by halves of the mass flow yields good results.

The partial flow passing through the diaphragm 17 arrives in an overflow tube 18 set onto the side of the baffle 9 that faces away from the inflow pipe 2. The tube 18 extends over the entire effective length of the cartridge filters 10. The upper opening of the overflow tube 18 is directed against an impingement baffle 19 in order to create an impingement diffusor. The impingement baffle 19, which extends perpendicularly to the longitudinal axis of the tank, is mounted in the turbid chamber above the cartridge holder 11.

As yet a further way to facilitate the flow to the cartridges, the side of the impingement baffle that faces the cartridge filters 10 is equipped with a second perforated collar 20. The height of the collar 20 corresponds approximately to the distance between the bottom side of impingement baffle and the opening of the overflow tube 18 and is operated in a manner similar to the first perforated collar 17. A further improvement of the flow conditions is achieved by the incorporation of a third perforated collar 21 that preceeds the second perforated collar 20. This collar 21 is concentric with the second collar 20 and fastened to the impingement baffle 19 but has a lower height than the second collar 20. The third perforated collar 21 acts to prevent the formation of high nonsymmetrical velocity peaks and large backflow zones under the impingement baffle.

Figure 2:
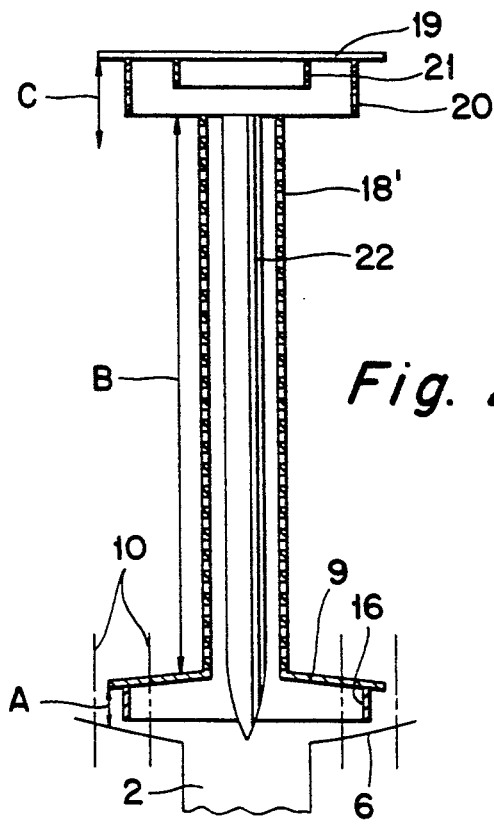
FIG. 2 schematically shows a second preferred embodiment of the filtering layout.

FIG. 2 shows, in a simplified manner, a second preferred embodiment of embodiment of the invention. Here, the overflow tube 18' is perforated. This tube may again consist of perforated sheet metal with a orifice ratio of about 40%. This creates a second outflow possibility for the working medium rising inside the overflow tube. A cylindrical displacement body 22 having a blunt upper end is located inside the tube 18'. The upper end of the body 22 is blunt and terminates with the opening of the tube 18'. Its lower end has a configuration to conform to the flow and projects into the recess of the baffle 9. It performs in this manner the function of the abovementioned diaphragm 17. The flow from the perforated tube is not radial but is in the longitudinal direction. This configuration therefore yields a highly uniform longitudinal flow both inside and outside the overflow tube 18' wherein the flows affect each other in a stabilizing fashion.

Figure 3:
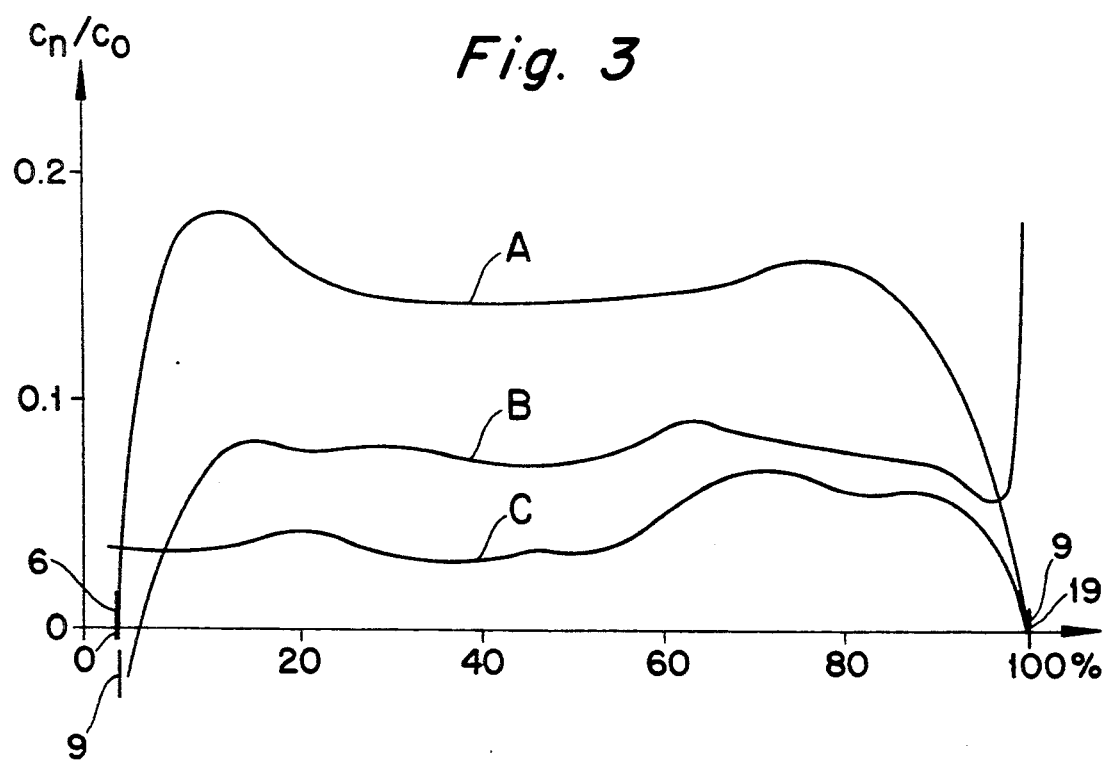
FIG. 3 shows a diagram of the velocity distribution in the flow channels.

The curves in FIG. 3 illustrate the quantitative and qualitative variation of velocities in the filter apparatus according to FIG. 2. The measuring points are designated in FIG. 2 with A, B and C. It is obvious that no absolute values are cited since the excessive number of parameters would make the valves of inadequate accuracy. On the abscissa, the prevailing channel heights are plotted (in %), and, on the ordinate, the ratio of the local flow velocity to the inflow velocity in the inflow tube 2 are plotted. A 100% channel height at the point C corresponds approximately to the double height of the perforated collar 20. It is seen that there are no large velocity peaks anywhere, that no backflows are present and that, fundamentally, the local velocities have values so low that no erosion of the resin on the impact side of the cartridges of the inner row, which are especially endangered, is to be expected.

The invention is obviously not restricted to the examples of water purification shown and described, but is fundamentally applicable to the purification of other liquids or gases. In a deviation from the layout shown, the impingement baffle may also be curved. Similarly, the perforated collars may be mounted by means of ribs on the overflow tube instead of on the impingement baffle.

What is claimed is:

1. A filtering apparatus comprising:
   a closed tank having an inflow pipe and an outflow pipe;
   a tube sheet disposed within said tank serving to divide the inside of said tank into a filtrate chamber and a turbid chamber and supporting a plurality of precoat cartridge filters in staggered rows, said cartridge filters being in communication with said filtrate chamber and supported by said tube sheet such that an effective surface of said cartridge filters extends into said turbid chamber, said inflow pipe being disposed substantially in the center of said tube sheet and oriented such that an opening of said inflow pipe is directed into said turbid chamber;

a baffle disposed in said turbid chamber having a first perforated collar facing said inflow pipe, said first perforated collar having a wall which extends parallel to a longitudinal axis of said cartridge filters, said baffle having a center recess from which an overflow tube extends in a direction away from said inflow pipe, said overflow tube extending substantially the entire effective height of said cartridge filters such that an upper opening of said overflow tube is directed against an impingement baffle, said impingement baffle disposed in said turbid chamber above said cartridge filters and oriented to be perpendicular to the longitudinal axis of said tank, said impingement baffle having a second perforated collar facing said cartridge filters.

2. A filtering apparatus according to claim 1, wherein the first perforated collar is located between an innermost row of said cartridge filters and an adjacent row of cartridge filters in the radially outward direction and extends a distance greater than one-half of a clearance between the impingement baffle and the opening of the overflow tube.

3. A filtering apparatus according to claim 1, wherein the second perforated collar has a height corresponding to the distance between said impingement baffle and the upper opening of the overflow tube.

4. A filtering apparatus according to claim 3, wherein said impingement baffle includes a third perforated collar concentrically surrounded by said second perforated collar and having a lower height than said second perforated collar.

5. A filtering apparatus according to claim 1, wherein a diaphragm is installed at an inlet of the overflow tube.

6. A filtering apparatus according to claim 1, further comprising a coaxial cylindrical displacement body disposed within said overflow tube and having a blunt upper end located at said upper end of said overflow tube, said overflow tube being perforated.

7. A filtering apparatus according to claim 6, wherein a lower end of the displacement body is configured to conform to the flow and to project into the recess in the baffle.

8. A filtering apparatus according to claim 1, wherein said first perforated collar is polygonal in shape.

9. A filtering apparatus according to claim 1, wherein said first perforated collar is cylindrical in shape.

10. A filtering apparatus according to claim 1, wherein said second perforated collar is polygonal in shape.

11. A filtering apparatus according to claim 1, wherein said second perforated collar is cylindrical in shape.

* * * * *